(12) United States Patent
Kameyama et al.

(10) Patent No.: US 12,510,891 B2
(45) Date of Patent: Dec. 30, 2025

(54) TRAVEL ROUTE CONTROL OF AUTONOMOUS WORK VEHICLE TO REDUCE TRAVEL DISTANCE

(71) Applicant: Honda Motor Co., Ltd., Tokyo (JP)

(72) Inventors: Naoki Kameyama, Saitama (JP); Takahide Konchi, Saitama (JP); Jin Nishimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/537,540

(22) Filed: Nov. 30, 2021

(65) Prior Publication Data

US 2023/0168672 A1 Jun. 1, 2023

(51) Int. Cl.
*G05D 1/00* (2024.01)
*A01D 34/00* (2006.01)

(52) U.S. Cl.
CPC ......... *G05D 1/0088* (2013.01); *G05D 1/0225* (2013.01); *G05D 1/0265* (2013.01); *G05D 1/0278* (2013.01); *A01D 34/008* (2013.01)

(58) Field of Classification Search
CPC .. A01D 34/008; G05D 1/0225; G05D 1/0265; G05D 1/0287
See application file for complete search history.

(56) References Cited

U.S. PATENT DOCUMENTS

| | | | |
|---|---|---|---|
| 8,942,862 B2 | 1/2015 | Markusson et al. | |
| 11,073,827 B2 | 7/2021 | Ko et al. | |
| 2016/0174459 A1* | 6/2016 | Balutis | A01D 34/008 701/25 |
| 2017/0139419 A1* | 5/2017 | Jägenstedt | B60L 8/003 |
| 2018/0242808 A1* | 8/2018 | Jung | G05D 1/0227 |
| 2018/0348790 A1 | 12/2018 | Reigo | |
| 2019/0049984 A1* | 2/2019 | Wong | G01C 21/3856 |
| 2019/0380266 A1* | 12/2019 | Liljedahl | A01D 34/008 |
| 2021/0228039 A1* | 7/2021 | Brouwers | A47L 9/0063 |
| 2021/0302986 A1* | 9/2021 | Ko | G05D 1/027 |

FOREIGN PATENT DOCUMENTS

| | | | | |
|---|---|---|---|---|
| EP | 3829830 | | 6/2021 | |
| JP | 6285979 | | 2/2018 | |
| WO | WO-2017204052 A1 * | 11/2017 | ............ A01B 69/00 |
| WO | 2021014586 | | 1/2021 | |

OTHER PUBLICATIONS

English Machine Translation of WO-2017204052-A1, Accessed Feb. 16, 2023.*

* cited by examiner

*Primary Examiner* — Jason Holloway
*Assistant Examiner* — Blake A Wood
(74) *Attorney, Agent, or Firm* — JCIPRNET

(57) ABSTRACT

An autonomous work vehicle including a position information obtaining unit, a driving unit, a control unit, and a memory storing a destination position. The position information obtaining unit includes a GNSS receiver acquiring a position of the autonomous work vehicle. The driving unit includes a motor. The control unit includes a processor. The processor is configured to calculate a direction of the destination position relative to a current position of the autonomous work vehicle, wherein the direction is calculated using the current position of the autonomous work vehicle and the position of the predetermined destination, and the driving unit drives the autonomous work vehicle in a traveling direction toward the direction of the destination position calculated by the processor.

6 Claims, 14 Drawing Sheets

TRAVEL ROUTE CONTROL OF AUTONOMOUS WORK VEHICLE TO REDUCE TRAVEL DISTANCE

BACKGROUND OF THE DISCLOSURE

Technical Field

The disclosure relates to travel route control of an autonomous work vehicle, and more specifically relates to travel route control of the autonomous work vehicle using a global navigation satellite system (GNSS).

Related Art

Conventionally, the autonomous work vehicle such as a robotic lawn mower has a need to return to a power charging station for charging power. Patent Literature 1 discloses a guide wire that is disposed in a working area, wherein the guide wire acts as a guide for guiding the robotic lawn mower to a predetermined destination (such as the power charging station).

LITERATURE OF RELATED ART

Patent Literature

Patent Literature 1: U.S. Pat. No. 8,942,862

However, when the robotic lawn mower traces the guide wire back to the predetermined destination a number of times, a rut may be formed near the guide wire due to the passage of the robotic lawn mower. In this way, the grass or ground may be damaged or an appearance of the grass or ground may appear to be disorganized to a human eye.

In addition, in a situation when the robotic lawn mower is not located near the guide wire, the robotic lawn mower must travel a distance in search of the guide wire until the guide wire is found, and then the robotic lawn mower may trace the guide wire back to the predetermined destination. In such a situation, a travel distance of the robotic lawn mower is increased and power is wasted.

Therefore, a way for reducing the formation of a rut and a way for reducing the travel distance of the robotic lawn mower is needed.

SUMMARY

According to an embodiment of the disclosure, an autonomous work vehicle includes a position information obtaining unit, a driving unit, a control unit, and a memory storing a destination position. The position information obtaining unit includes a GNSS receiver acquiring a position of the autonomous work vehicle. The driving unit includes a motor. The control unit includes a processor. The processor is configured to calculate a direction of the destination position relative to a current position of the autonomous work vehicle, wherein the direction is calculated using the current position of the autonomous work vehicle and the position of the predetermined destination, and the driving unit drives the autonomous work vehicle in a traveling direction toward the direction of the destination position calculated by the processor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
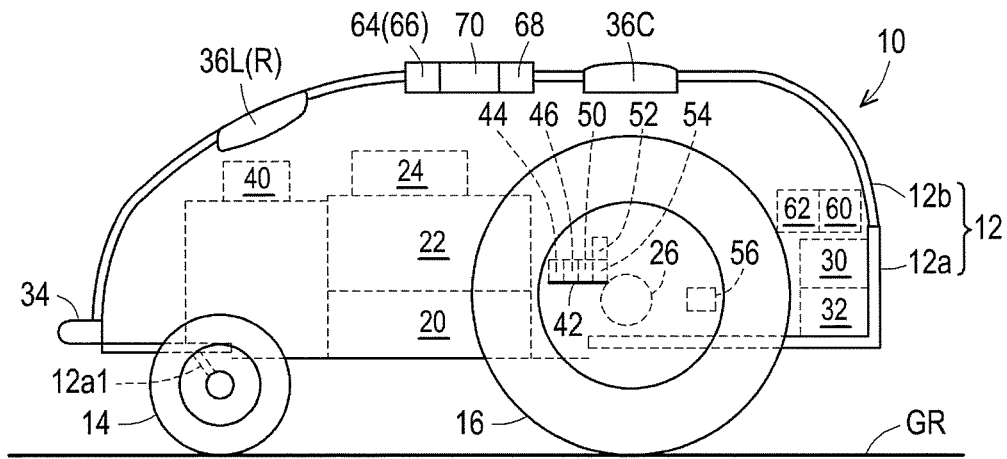
FIG. 1 is an overall schematic diagram showing a utility vehicle according to an embodiment of this disclosure.
Figure 2:
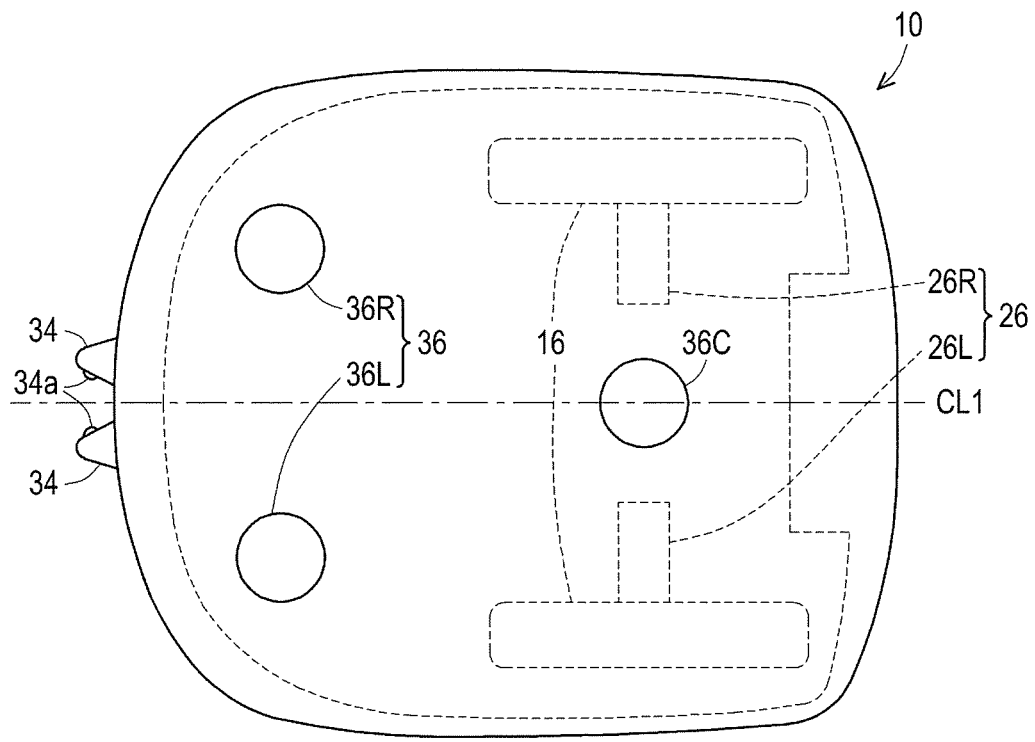
FIG. 2 is a plan view of the utility vehicle illustrated in FIG. 1.
Figure 3:
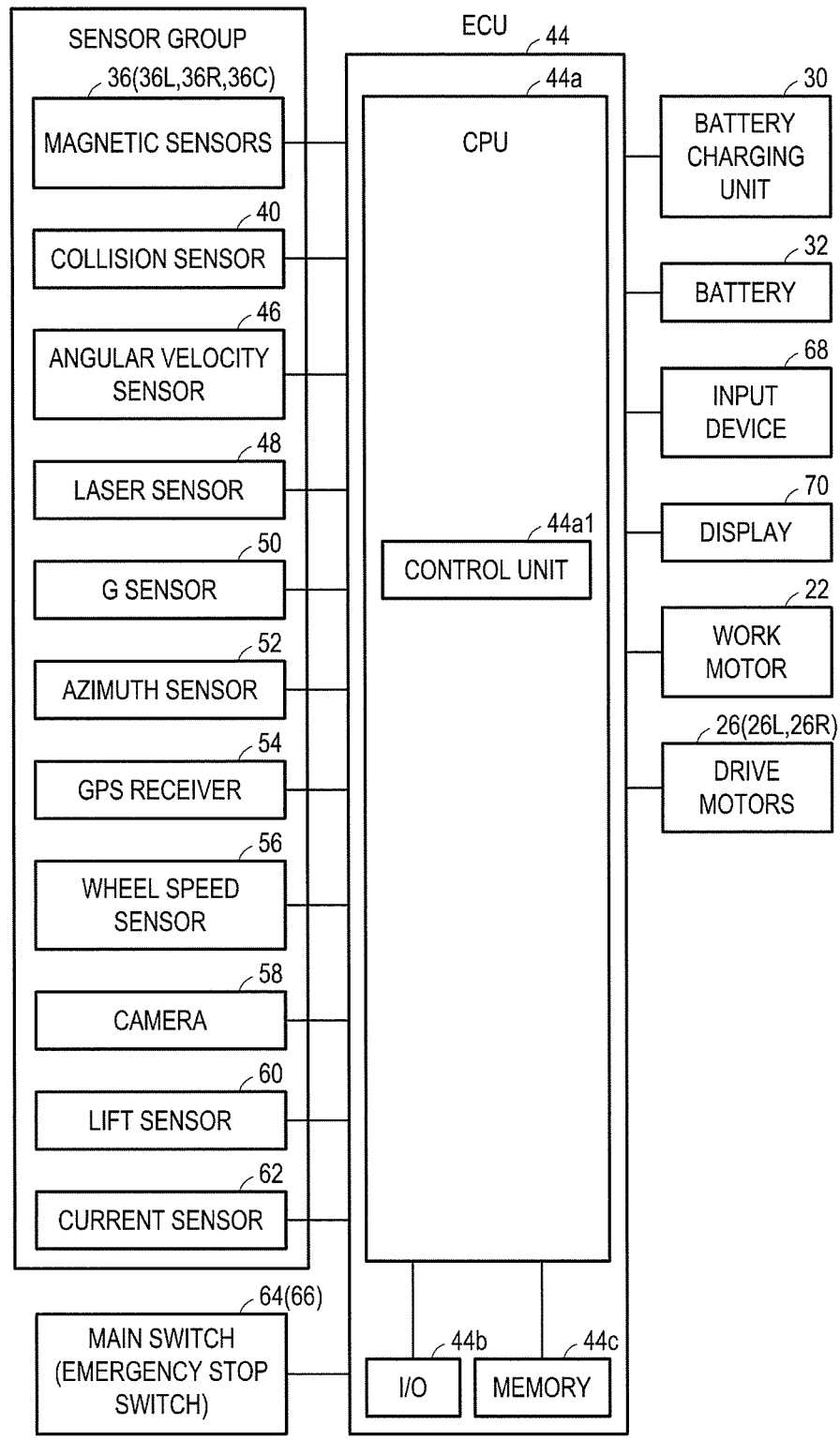
FIG. 3 is a block diagram showing inputs to an Electronic Control Unit installed in the utility vehicle illustrated in FIG. 1.

FIG. 1 is an overall schematic diagram showing a utility vehicle according to an embodiment of this disclosure, FIG. 2 is a plan view schematically illustrating the configuration of the utility vehicle illustrated in FIG. 1; and FIG. 3 is a block diagram showing the configuration of an electronic control unit (ECU) of the utility vehicle according to the present embodiment.

As shown in FIG. 1, reference symbol 10 designates a utility vehicle, more precisely an autonomously navigating utility vehicle, e.g., a mower; hereinafter called "vehicle".

The utility vehicle of the present disclosure can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22. The electric motor 22 is an example of a driving unit.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12 b.

The weight and size of the vehicle 10 are such that it can be transported or carried by the operator. As an example, the vehicle 10 may have a total length (forward-rearward direction length) about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle. The vehicle 10 is an example of an autonomous work vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a body center line CL of the vehicle body 12 running in the forward-rearward direction along the widthwise center of the vehicle 10. In addition, a third magnetic sensor 36C is installed on the body center line CL1 at a location remote from the sensors 36L and 36R. The magnetic sensors 36 produces an output indicating magnitude of magnetic field signal (magnetic field strength or intensity). The magnetic sensors 36R, 36L, 36C are examples of a signal detection part of the disclosure.

A collision (contact) sensor 40 is attached to the frame 12b. The collision sensor 40 outputs an ON signal when the frame 12 b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor or processor) 44a, I/O 44b, and memory (ROM, RAM, EEPROM, etc.) 44c and the like. The ECU 44 is an example of a control unit.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that acquires a position of the vehicle 10). The GPS receiver 54 is an example of a Global Navigation Satellite System (GNSS) receiver, and acquires a position of the vehicle 10. The GNSS receiver is an example of a position information obtaining unit. As an example, the position data or position coordinates may be transmitted in National Marine Electronics Association (NMEA) format wherein the longitudinal and latitudinal coordinates are represented by degrees and decimal minutes.

Wheel speed sensors 56 installed near the rear wheels 16 produce outputs indicating the wheel speeds of the rear wheels 16, and a lift sensor 60 installed between the chassis 12 a and the frame 12b outputs an ON signal when the frame 12b is lifted off the chassis 12 a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotate one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the work in the working area AR.

The detection of the working area AR and the work thereat will be explained with reference to FIG. 4.

The working area AR is delineated by laying (burying) a boundary wire (electrical wire) 72 around a periphery (boundary) of the working area AR. A charging station 76 for charging the battery 22 of the vehicle 10 may be installed inside or outside of the working area AR. In FIG. 4, the charging station 76 is disposed at a location inside the working area AR. However, the disclosure is not limited thereto.

Figure 4:
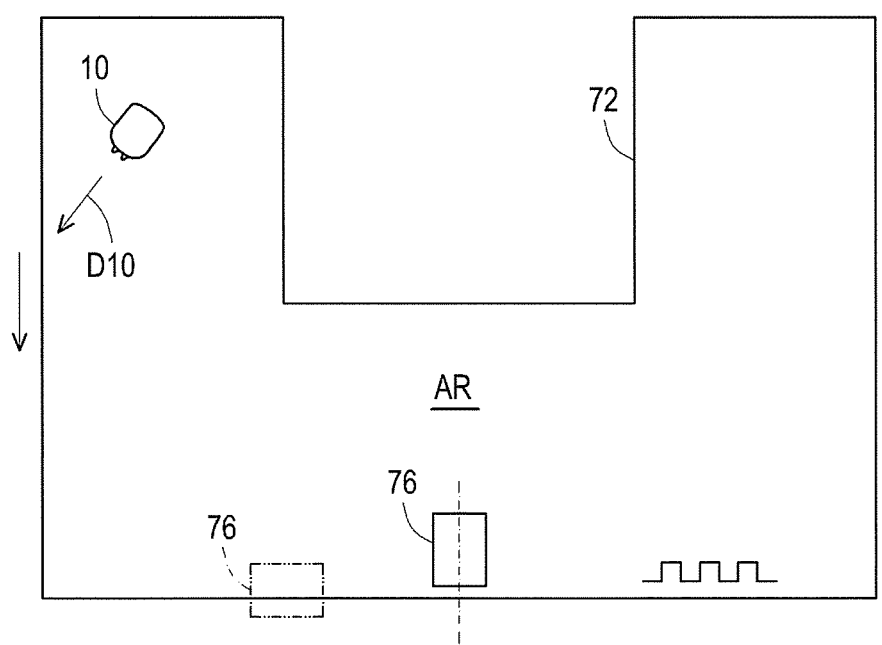
FIG. 4 is an explanatory diagram showing a working area (delimited by a boundary wire) of the utility vehicle illustrated in FIG. 1.
Figure 5:
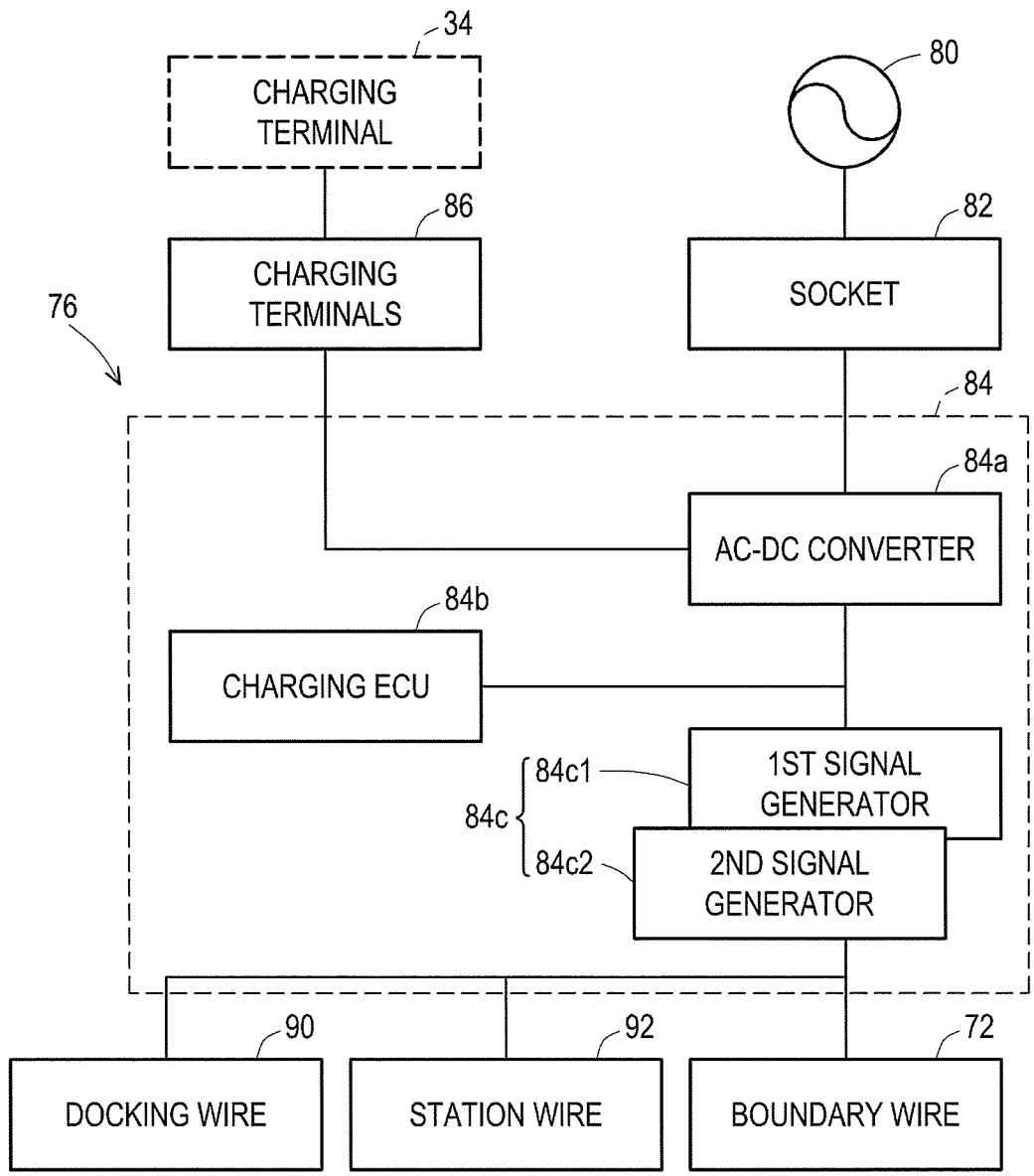
FIG. 5 is a block diagram showing configuration of a charging station of the utility vehicle shown in FIG. 4.

FIG. 5 is a block diagram showing an electrical configuration of a charging station in FIG. 4.

As shown in FIG. 5, the charging station 76 is equipped with a charger 84 connected to a commercial power supply 80 through a socket 82, and a pair of charging terminals 86 connected to the charger 84. The pair of charging terminals 86 are configured to be connectable to the pair of charging terminals 34 disposed on the vehicle 10 through the contacts 34 $a$ (shown in FIG. 2) of the pair of charging terminals 34.

The charger 84 is equipped with an AC-DC converter 84$a$, a charging ECU (Electronic Control Unit) 84$b$ also comprising a microcomputer and used to control operation of the AC-DC converter 84$a$, and two signal generators 84$c$ (a first signal generator 84$c$1 and a second signal generator 84$c$2). The first signal generator 84$c$1 and the second signal generator 84$c$2 are examples of a signal generating device.

The charging station 76 is configured so that alternating current passing from the commercial power supply 80 through the socket 82 is converted to direct current and is stepped down to a suitable voltage by the AC-DC converter 84$a$ of the charger 84 and sent to the charging terminals 86 to charge the onboard battery 32 through the charging contacts 34 and 86 when the lawnmower 10 is returned and connected to the charging station 76. The AC-DC converter 84$a$ steps down the current to a suitable voltage in response to commands determined by the ECU 44 and sent from the charging ECU 84$b$.

At the same time, the output of the AC-DC converter 84 is supplied to the charging ECU 84$b$ and signal generators 84$c$ (comprising a first signal generator 84$c$1 and a second signal generator 84$c$2). The charging ECU 84$b$ is configured to be capable of communicating with the ECU 44 and controls operation of the first signal generators 84$c$1 and the second signal generator 84$c$2 by sending binary data pulses.

In response thereto, the first and second signal generators 84$c$1, 84$c$2 convert the direct current stepped down by the AC-DC converter 84$a$ into area signals in continuance sequence of pulse train and supply the generated area signals to the boundary wire 72, a docking wire 90 for guiding the vehicle 10 to a charging position, and a station wire 92 for delineating the charging station 76.

Figure 6:
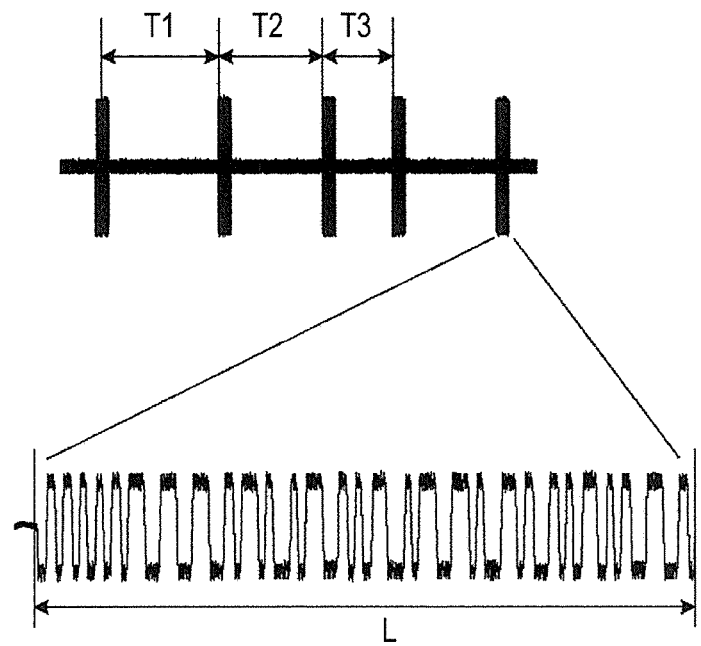
FIG. 6 is an explanatory diagram showing data signal of pulse train generated by a signal generator illustrated in FIG. 5.

FIG. 6 shows the pulse train generated by the first signal generator 84$c$1 to be passed through the boundary wire 72 that is corresponding to the binary data pulses sent from the charging ECU 84$b$. Although not shown, the pulse train signal generated by the second signal generator 84$c$2 may be similar to the pulse train generated by the first signal generator 84$c$1. However, in another embodiment of the disclosure, the pulse train signal generated by the second signal generator 84$c$2 may be different from the pulse train signal generated by the first signal generator 84$c$1. By generating different pulse train signals, different wires (such as area wire 72, guide wire 73, docking wire 90, station wire 92) may be differentiated and recognized by the vehicle 10 based on pulse train of the detected signal, and a general location of the vehicle 10 may be deduced. It should be understood, a number of the signal generators may be determined according to requirements and is not limited to the first and second signal generators 84$c$1, 84$c$2. In addition, the "wire" recited herein may refer to any wire, for example, the area wire 72, the guide wire 73, the docking wire 90, the station wire 92 and the like. In the present disclosure, for example, the guide wire 73 is configured as a shortcut wire for the vehicle 10 to return to the station 76. In other words, the guide wire is an example of the shortcut wire.

The detection of the working area AR shown in FIG. 4 will be explained.

When electric current of the data signal shown in FIG. 6 is supplied to the boundary wire 72 by the first signal generator 84$c$1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72. The magnetic sensors 36L, 36R, 36C are configured to detect a signal emitted by a signal generating device such as the first and second signal generators 84$c$1, 84$c$2.

Figure 7:
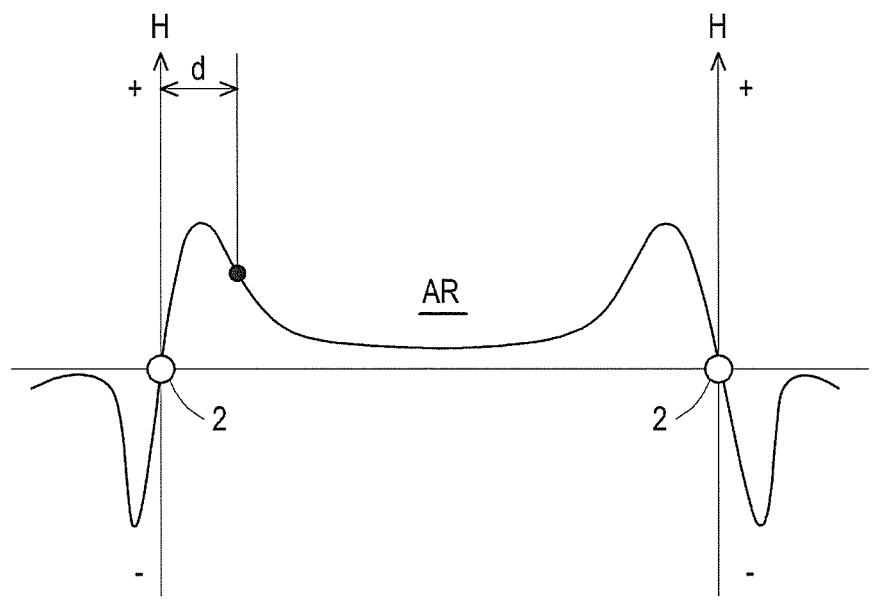
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
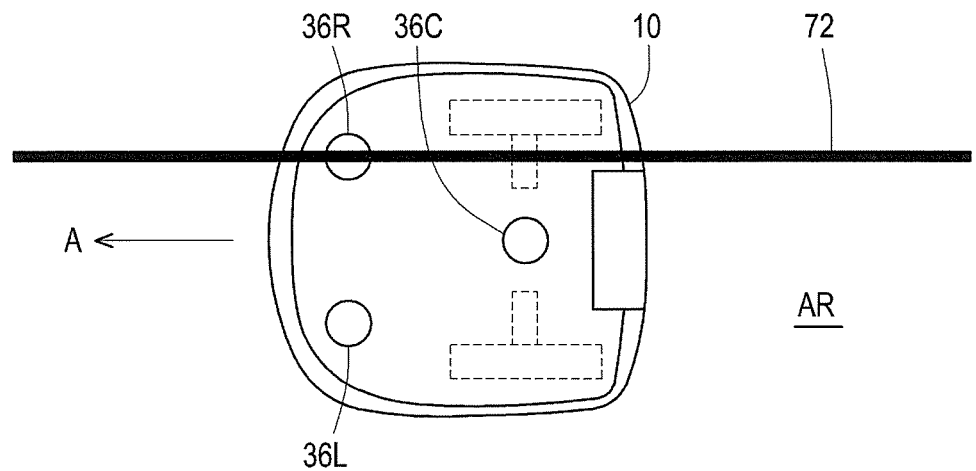
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

In the above embodiment, it was described where the magnetic sensor 36R detects a magnetic field signal emitted from a boundary wire 72 disposed at a working area AR, wherein the control unit 26 controls the vehicle 10 to trace the boundary wire 72 so that magnetic field strength H detected by the magnetic sensor 36R stays at 0, such that the vehicle 10 runs on the boundary wire 72.

In another embodiment of the disclosure, the control unit 26 may control the vehicle 10 to trace the boundary wire 72 at a predetermined variable distance by steering the vehicle 10 to keep the detected magnetic field signal H within a predetermined range or at a predetermined magnetic field signal H. The predetermined variable distance, for example, may be set between 1-2 meters, 2-5 meters, 1.3-3.6 meters, 2.0-10.0 meters and the like. The predetermined magnetic field signal H may correspond to a distance of 1.0, 2.0, 3.5 meters from the wire and the like. However, the disclosure is not limited thereto. The predetermined variable distance may be set to other distances or between other distance ranges according to requirements. The predetermined variable distance is set by keeping the detected magnetic field signal H within a predetermined range that corresponds to the target distances. The predetermined variable distance refers to, for example, a distance from the wire being traced to the body center line CL1 of the vehicle 10. In another embodiment of the disclosure, the predetermined variable distance refers to, for example, a distance from the wire to a side of the vehicle 10 that is closest to the wire. In another embodiment of the disclosure, the predetermined variable distance refers to, for example, a distance from the wire to a side of the frame 12b of the vehicle 10 that is closest to the wire. In another embodiment of the disclosure, the predetermined variable distance refers to, for example, a distance from the wire to one of the magnetic sensors 36.

Figure 9:
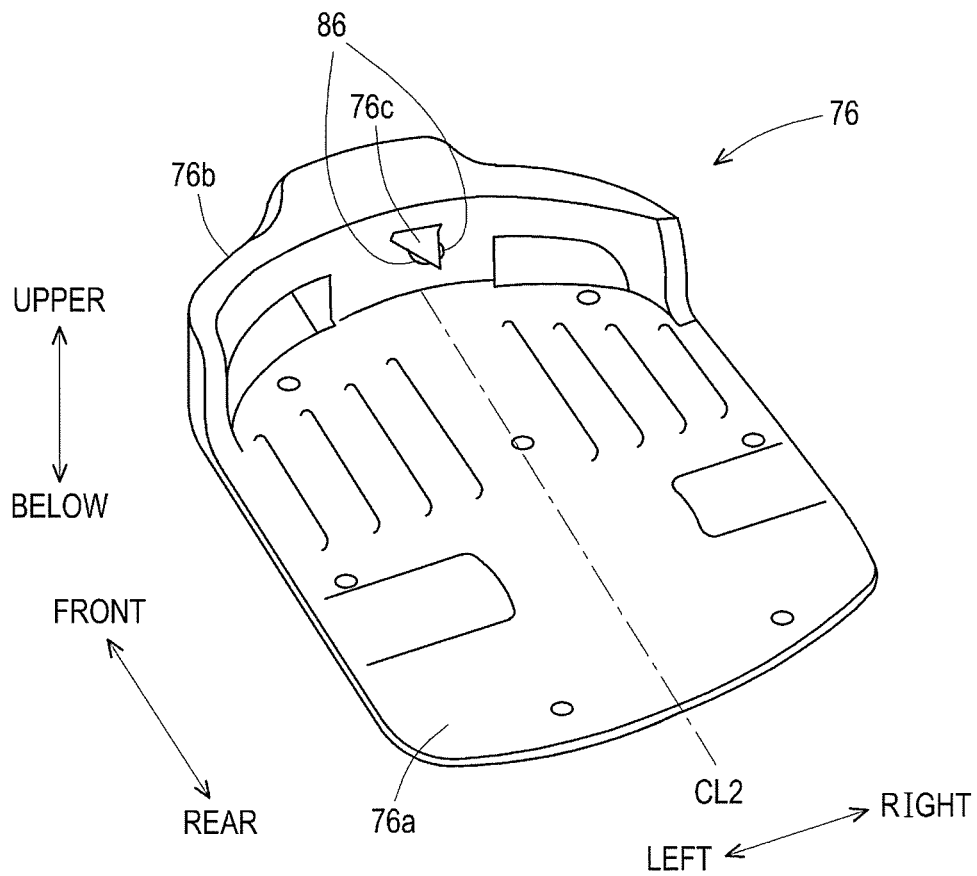
FIG. 9 is a perspective diagram illustrating the physical structure of the charging station according to an embodiment of the disclosure.
Figure 10:
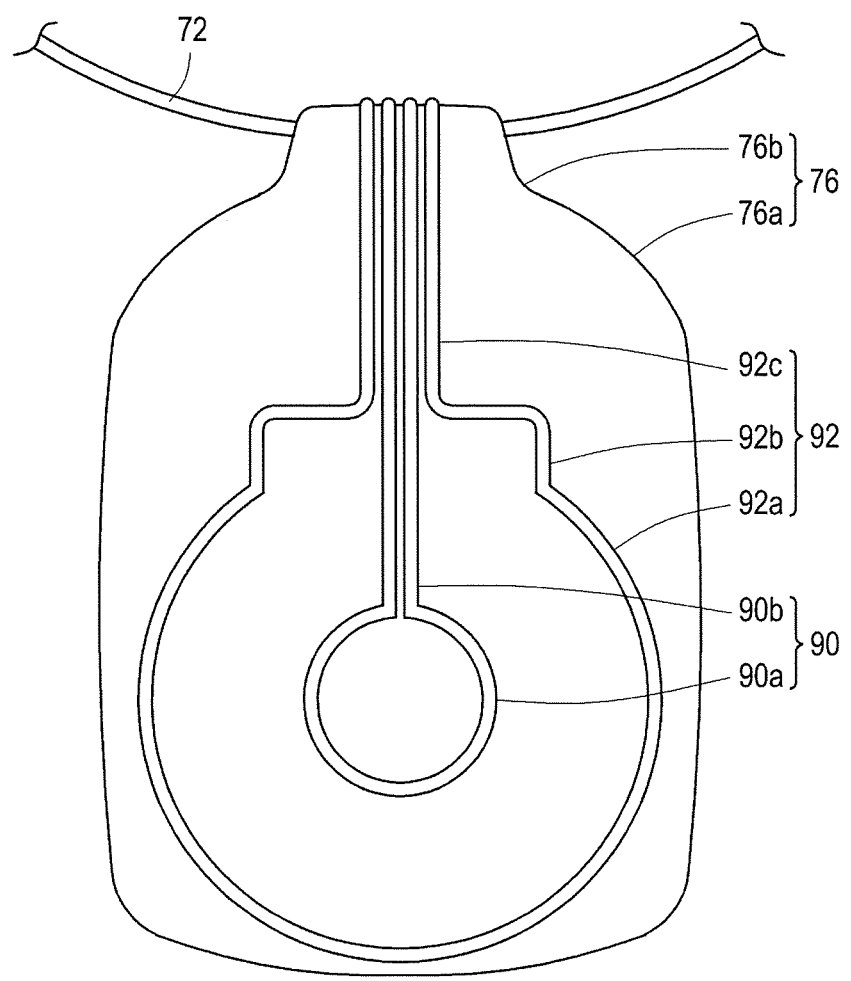
FIG. 10 is a top plan views of a base plate of the charging station shown in FIG. 9
Figure 11:
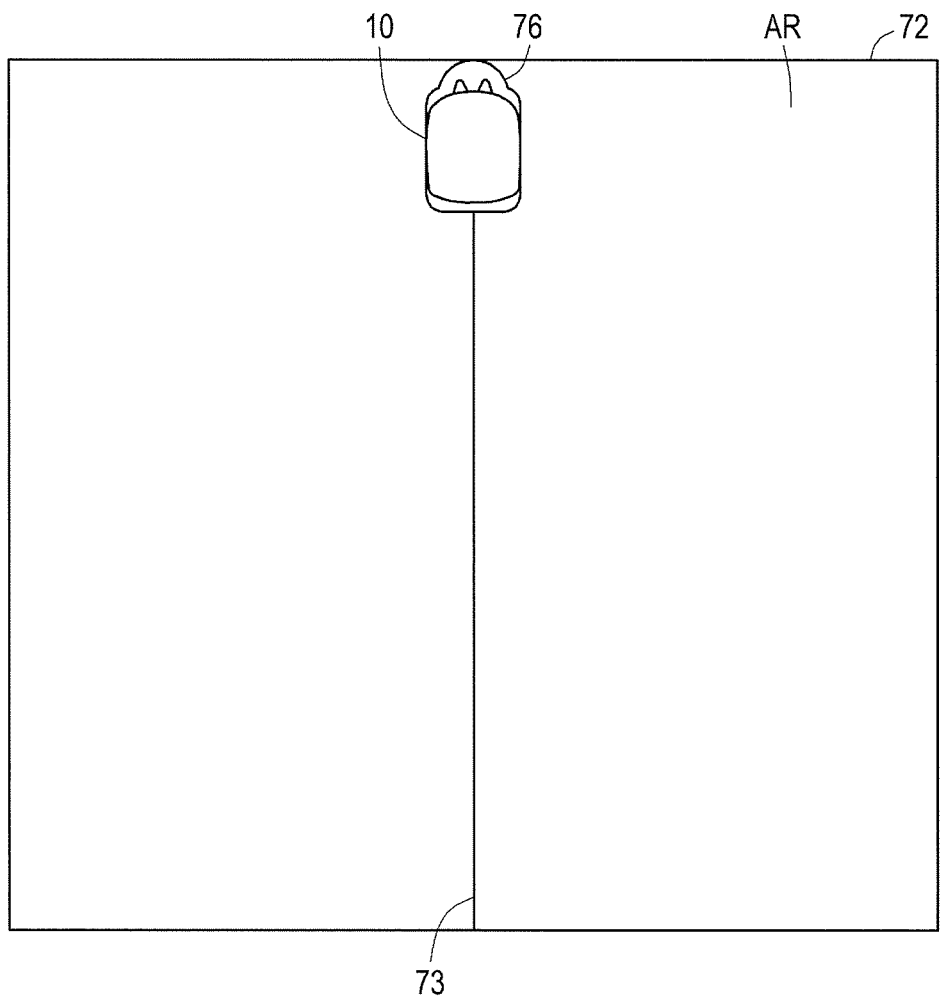
FIG. 11 is a schematic diagram illustrating a configuration where utility vehicle is docked at the charging station according to an embodiment of the disclosure.

FIG. 9 is a perspective diagram illustrating the physical structure of the charging station 76 according to this embodiment. For convenience in the following, three orthogonal directions shown in the drawing are respectively defined as forward-rearward direction (length direction), lateral direction (width direction) and vertical direction (height direction) of the charging station 76.

As seen in FIG. 9, the charging station 76 has a base plate 76a of substantially the same size as the vehicle 10 for retaining the vehicle 10 during charging, a guide 76b erected at the front end of the base plate 76a for constraining position of the vehicle 10 during charging, and a substantially triangular terminal unit 76 c projecting rearward from an upper and laterally middle part of the guide 76b.

The terminal unit 76 c is configured to be insertable between the pair of left-right battery charging terminals 34 of the vehicle 10, and the pair of left-right terminals 86 of the charging station 76 is symmetrically provided with respect to a longitudinal direction axis CL2 passing through the center of the charging station 76, whereby the structure enables charging of the onboard battery 32 through the terminals 86 and 34.

As shown in FIG. 4, in this embodiment the charging station 76 is installed inside the working area AR, and in an orientation perpendicular to the boundary wire 72.

In the charging station 76, the aforesaid battery charging unit 84 is mounted on a circuit board (not shown) accommodated inside the guide 76b, and the battery charging unit 84 has connected thereto the docking wire 90 for guiding the vehicle 10 to the docking position for docking with the charging terminals 86 and the station wire 92 for, in advance of the docking, guiding the vehicle 10 by enabling it to recognize and approach the position of the charging station 76.

According to an embodiment of the disclosure, the vehicle 10 acquires a destination position D. The destination position D, for example, is a station where the vehicle 10 docks to recharge power or waits in standby. The GPS receiver 54 of the vehicle 10 acquires a position of the vehicle 10 while the vehicle 10 is docked at the station 76, and sets the acquired position as the destination position D. The destination position D is stored in the memory 44c of the vehicle 10. In this way, there is not need for a user to set a location of the station.

In another embodiment, the GPS receiver 54 of the vehicle 10 may acquire a plurality of positions of the vehicle 10 while the vehicle 10 is docked at the station 76. The destination position D may be set using the plurality of positions. For example, the destination D may be set by averaging the plurality of positions. The destination position D is stored in the memory 44c of the vehicle 10.

In another embodiment of the disclosure, the destination position D may be a position at which the vehicle 10 has last finished performing work. For example, the destination position D may be set to the last position where the grass had been cut by the vehicle 10. The destination position D is stored in the memory 44c of the vehicle 10. By setting the destination position D to the last position where the grass had been cut by the vehicle 10, the grass cutting may be resumed at the destination position D where the grass cutting was left off.

Figure 15:
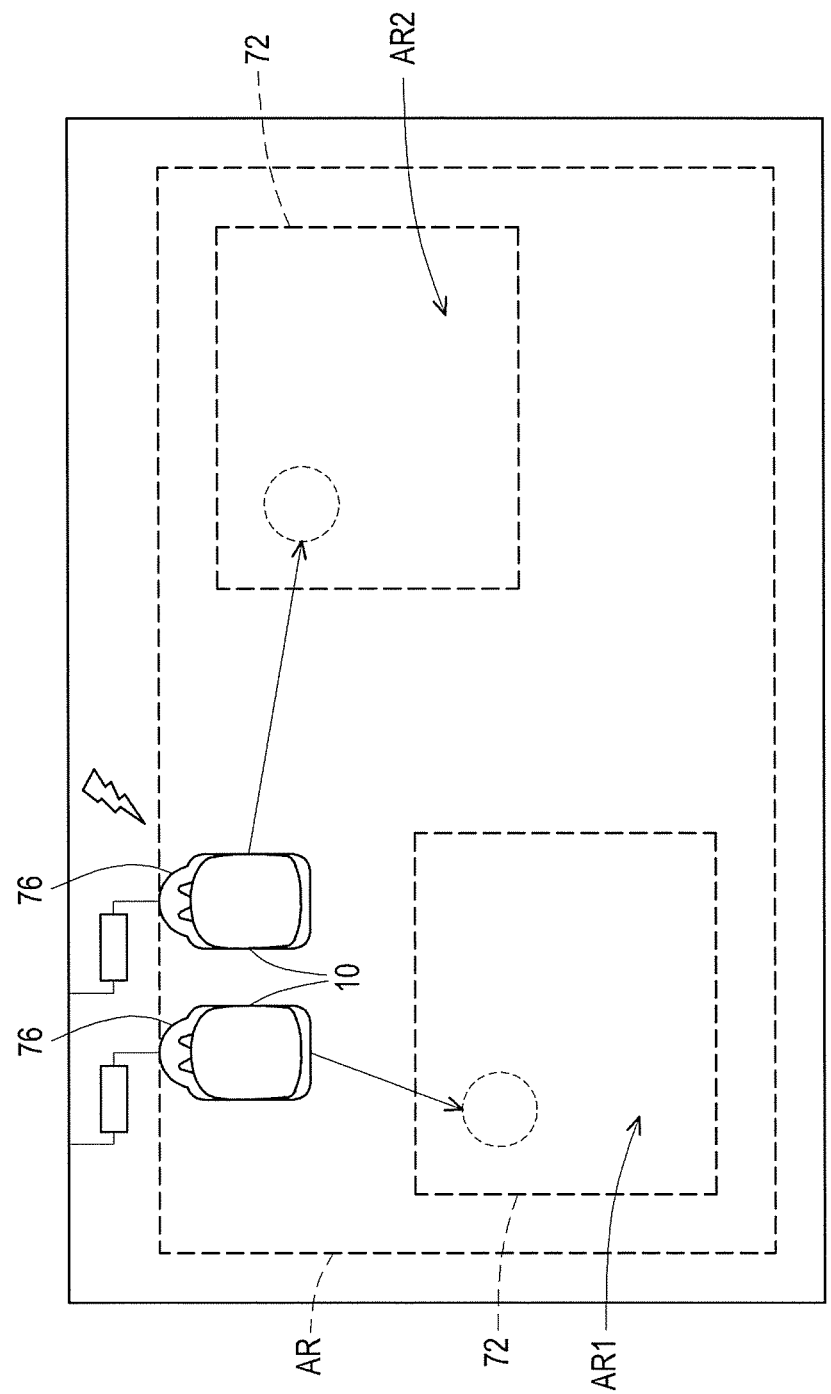
FIG. 15 is a schematic diagram illustrating an example in which a work plan includes cutting grass at a plurality of working areas.

In another embodiment of the disclosure, the destination position D may be set to a predetermined position in accordance to a work plan. For example, as shown in FIG. 15, the work plan may include cutting grass at a plurality of working areas (a first working area AR1, a second working area AR2). The number of working areas is not limited thereto and may be set according to requirements. By setting the destination position D to a predetermined position, for example, to a position at the first working area AR2, the vehicle 10 may be controlled to travel, for example, from the first working area AR1 to the second working area AR2, and therefore travelling between working areas may be facilitated.

Figure 12:
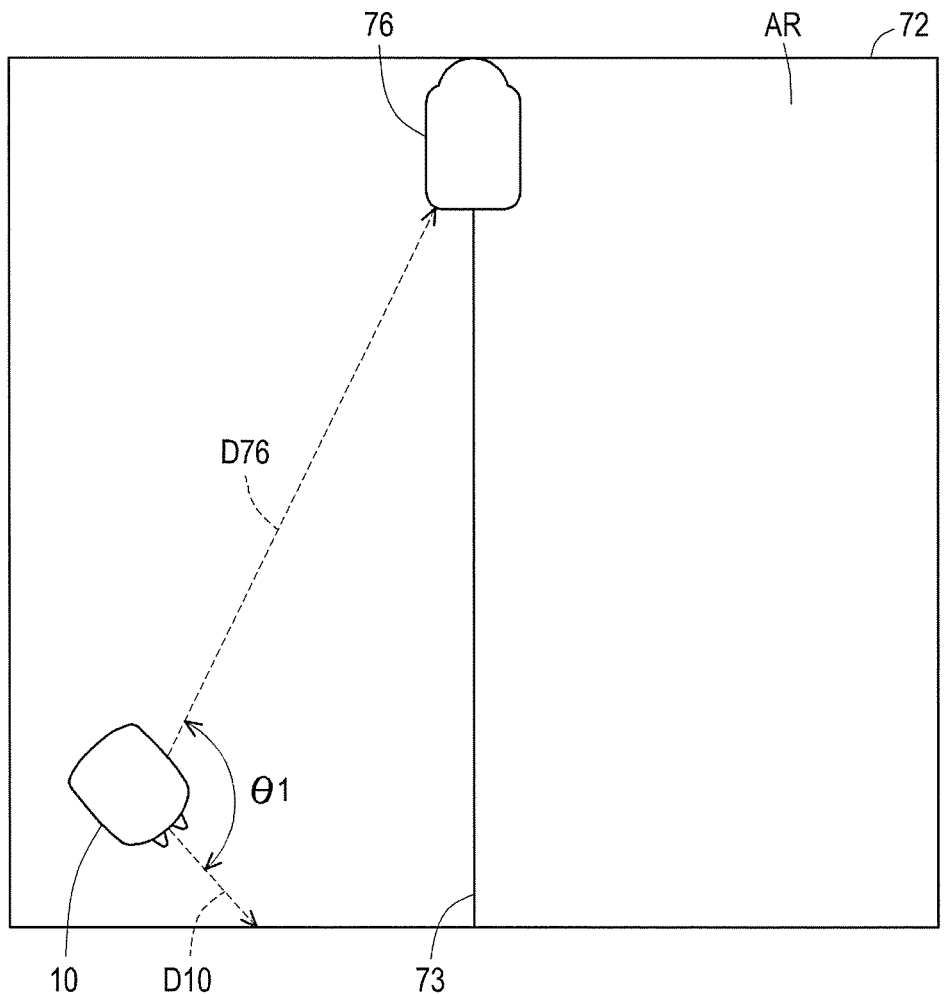
FIG. 12 is a schematic diagram illustrating an example of calculating the first angle θ1 according to an embodiment of the disclosure.

Referring to FIG. 12, the ECU 44 is configured to calculate a direction D76 of the destination position D relative to a current position of the vehicle 10. The direction is calculated using the current position of the vehicle 10 and the position of the predetermined destination D. In more detail, the ECU 44 calculates a first angle $\theta 1$. The first angle $\theta 1$ is calculated by a difference in angle between the direction D76 of the destination position D and a current pointing direction D10 of the vehicle 10. The current pointing direction D10 of the vehicle 10 is acquired from a change between a current GPS location and a GPS location obtained after traveling straight for a predetermined distance. In addition, the current pointing direction D10 of the vehicle 10 may be calculated using a combination of an angular velocity obtained from the angular velocity sensor (yaw-rate sensor; yaw sensor) 46, an acceleration obtained from the G sensor (acceleration sensor) 50, an azimuth obtained from the direction sensor 52 that generates the output indicating direction (azimuth) of the vehicle 10 according to terrestrial magnetism, and position information obtained from the GPS (Global Positioning System) receiver 54.

Figure 13:
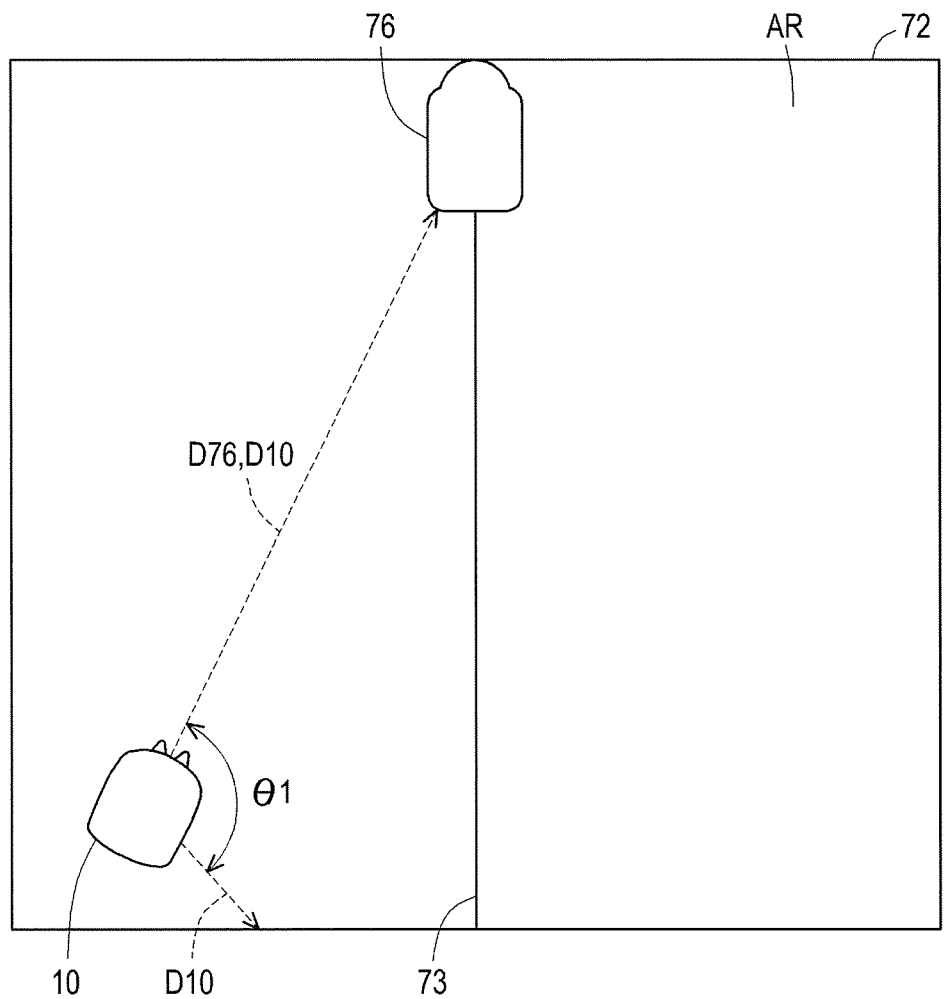
FIG. 13 is a schematic diagram illustrating an example of aligning a traveling direction of the utility vehicle with a direction of the destination position according to an embodiment of the disclosure.

Referring to FIG. 13, after the first angle $\theta 1$ is obtained, the ECU 44 turns the vehicle 10 by an amount calculated by the first angle $\theta 1$ such that the direction D76 of the destination position D and the current pointing direction D10 of the vehicle 10 are aligned. In other words, the ECU 44 is configured to steer the vehicle 10 to align the traveling direction D10 of the vehicle 10 with the direction D76 of the destination position D calculated by the ECU. After the traveling direction D10 of the vehicle 10 is aligned with the direction D76 of the destination position D, the drive motors 26 drives the vehicle 10 straight in the direction D76 of the destination position D calculated by the ECU 44 without using the GPS receiver 54 to control the steering of the vehicle 10. In another embodiment of the disclosure, the GPS receiver 54 may be turned off while the drive motors 26 drives the vehicle 10 straight in the direction D76 of the destination position D. The vehicle 10 may use the "pivot-turn" described above to align the traveling direction D10 of the vehicle 10 with the direction D76 of the destination position D, however the disclosure is not limited thereto.

In this way, even when the vehicle 10 is not located near the guide wire 73, the vehicle 10 does not need to travel in search of the guide wire 73 to return to the station 76, and power is not wasted.

Due to an error tolerance in GPS positioning accuracy, a situation may occur where the vehicle 10 may wobble, stagger, zigzag and/or be unable to be driven forward due to the GPS error. Therefore, after the traveling direction D10 of the vehicle 10 is aligned with the direction D76 of the destination position D, the drive motors 26 drives the vehicle 10 straight in the direction D76 of the destination position D calculated by the ECU 44 without using the GPS receiver 54 to control the steering of the vehicle 10, in order to prevent the vehicle 10 from wobbling, staggering, zigzagging and/or being unable to be driven forward and the like. In other words, the GPS position of the vehicle 10 is used only for turning or steering the vehicle 10 to align the traveling direction D10 of the vehicle 10 with the direction D76 of the destination position D calculated by the ECU, but the GPS positioning of the vehicle is not used to steer the vehicle 10 when being driven straight towards destination position D calculated by the ECU 44.

In this way, the vehicle 10 may return to the station even when GPS accuracy is low.

In addition, when the vehicle 10 is driven straight in the direction D76 of the destination position D, the work unit, e.g., the mower blade (rotary blade) 20 may be turned off so as to not cut the grass. However, disclosure is not limited thereto and the work unit may be turned on when the vehicle 10 is driven straight in the direction D76 of the destination position D according to requirements.

Figure 14:
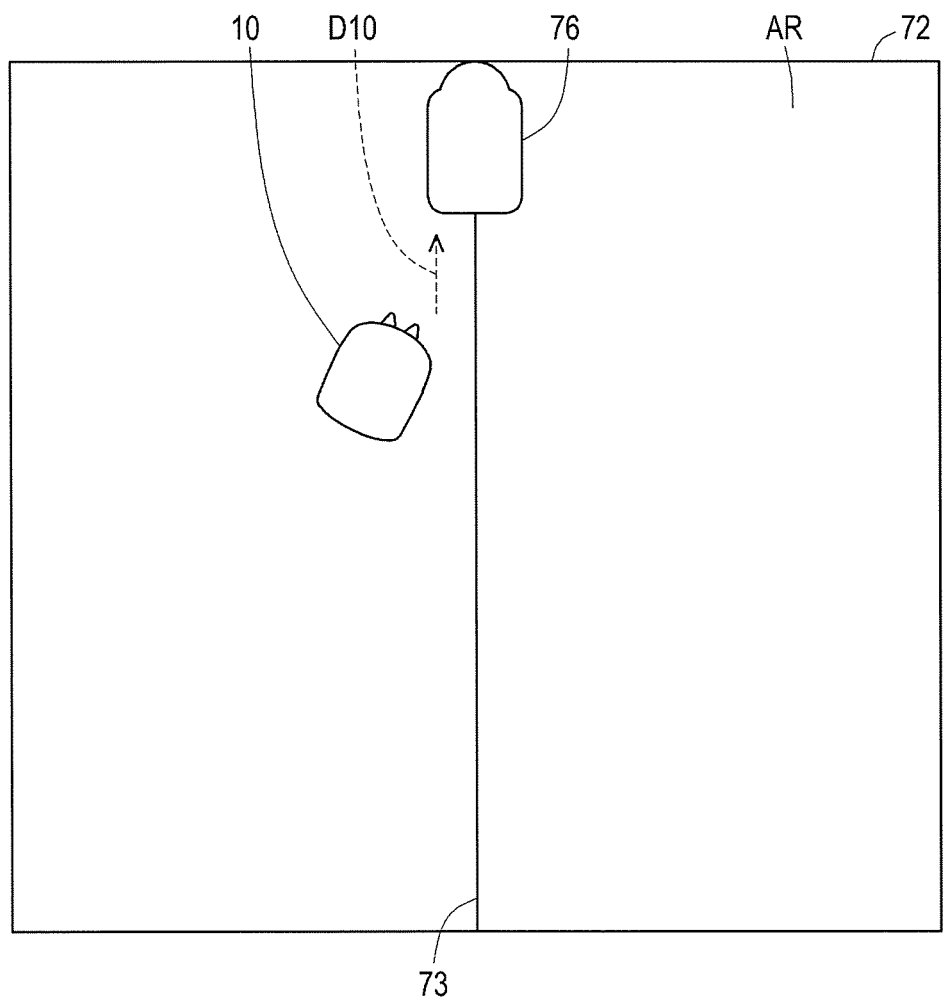
FIG. 14 is a schematic diagram illustrating an example of the utility vehicle after the utility vehicle is driven in the direction of the destination position and a signal detection part detects a signal generated by a signal generating device.

Referring to FIG. 14, after the vehicle 10 is driven in the direction D76 of the destination position D and the signal detection part (for example, the magnetic sensor 36L, 36R, 36C) detects the signal H generated by the signal generating device (for example, the first or second signal generators 84c1, 84c2), the control unit (ECU 44) controls the vehicle 10 based on the detected signal H.

In more detail, as shown in FIG. 8 for example, after the vehicle 10 is driven in the direction D76 of the destination position D and the magnetic sensor 36 detects the signal H from the boundary wire 72 (or from the guide wire 73), the vehicle 10 may be driven in trace mode to circuit along the boundary wire 72 (or along the guide wire 73) and guided back to the charging station 76 for recharging or stand-by. That is say, the signal detection part (magnetic sensor 36R) detects a guidance signal H for guiding the vehicle 10 to the station 76. Specifically, the signal detection part (magnetic sensor 36R) detects the magnetic field signal H emitted from a wire (boundary wire 72 or guide wire 73 and the like) disposed at a working area AR of the vehicle 10.

When the vehicle 10 is driven straight to the destination position D directly (such as the station 76 directly) to detect the magnetic field signal H emitted from the wire, the travel distance of the vehicle 10 may be reduced compared to a case where the vehicle 10 must trace along a boundary of the working area AR when travelling to the destination position D (such as the station 76), and therefore the battery power consumption of the vehicle 10 is reduced. Furthermore, since the travel route of the vehicle 10 is based according to the current position of the vehicle 10, the travel route will not be worn and the formation of a rut is reduced.

Figure 16:
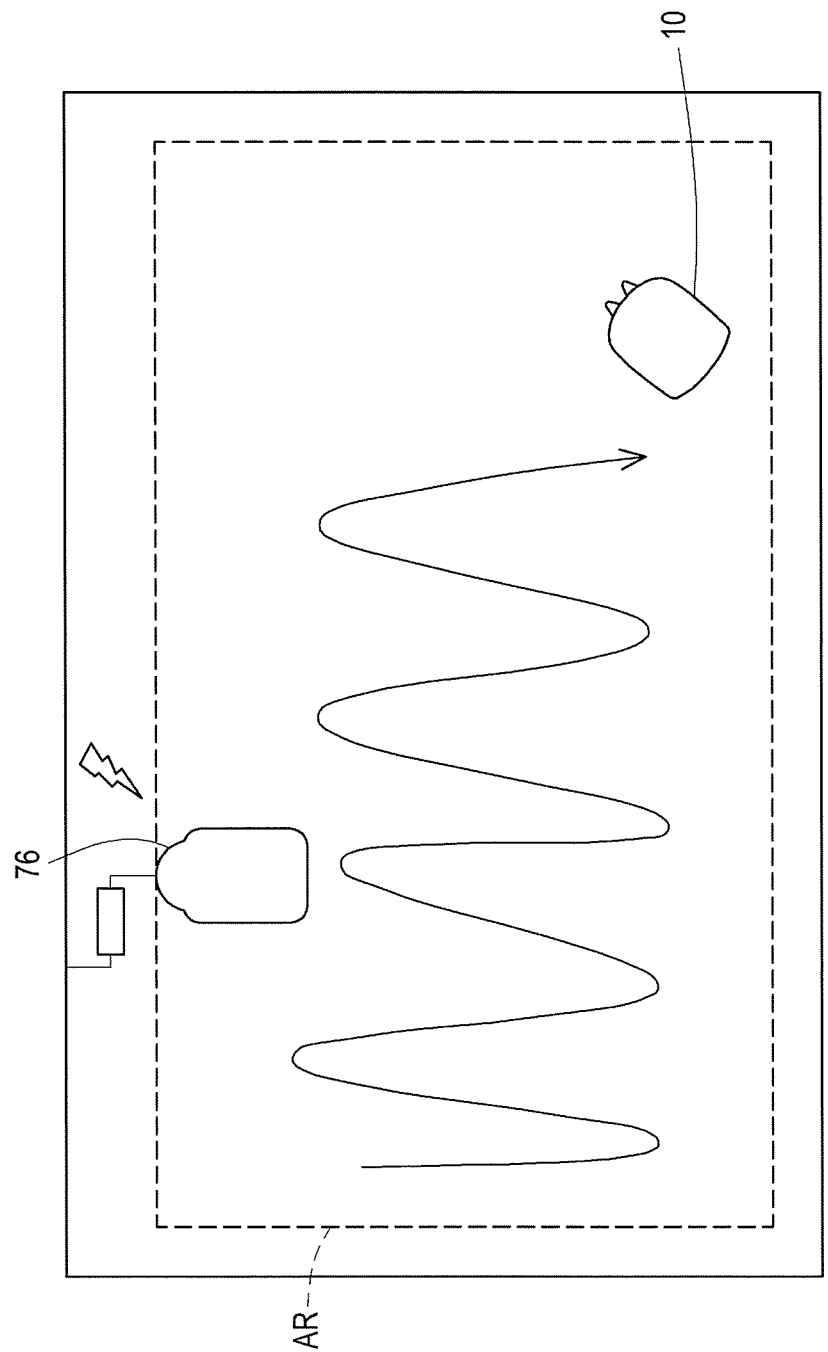
FIG. 16 is a schematic diagram illustrating an example in which a guidance signal is a radio wave emitting device.

In the above described embodiment, the "guidance signal" was described as the magnetic field signal H emitted from a wire and/or a signal generating device (first or second signal generators 84c1, 84c2). However, the disclosure is not limited thereto. The guidance signal may be a signal emitted from a relay device relaying GPS signals, a radio wave emitting device such as a beacon and the like illustrated in FIG. 16. That is to say, the signal generating device is configured to provide the vehicle 10 with position information of the vehicle 10 using a guidance signal.

In another embodiment of the disclosure, the position information of the vehicle 10 may be acquired through a camera mounted on the vehicle 10, or a stationary camera mounted near the working area AR of the vehicle 10.

Figure 17:
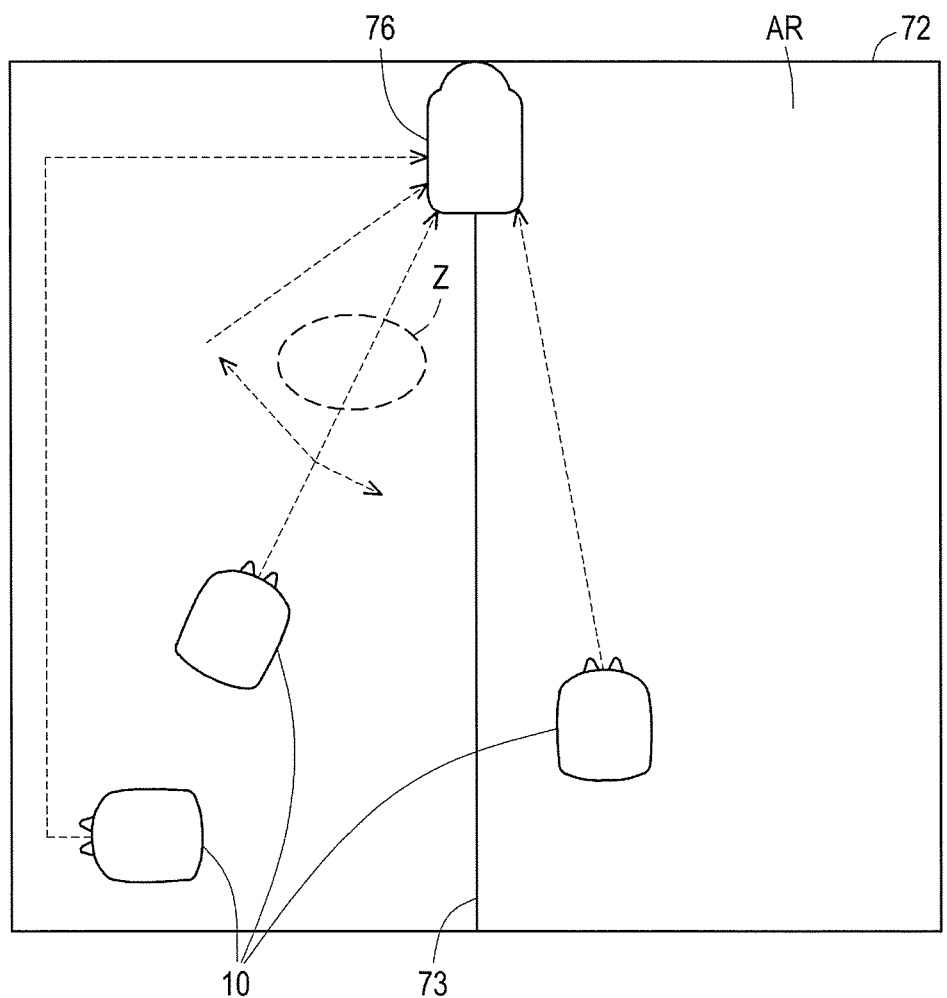
FIG. 17 is a schematic diagram illustrating an example in which an obstacle is detected in a travel path of the utility vehicle.

Next, referring to FIG. 17, as the drive motors 26 drives the vehicle 10 straight in the direction D76 of the destination position D calculated by the ECU 44 without using the GPS receiver 54 to control the steering of the vehicle 10, a laser sensor or a camera including an image sensor (not shown) disposed on the vehicle 10 may detect an obstacle Z in the travel path of the vehicle 10. The camera and the laser sensor may be configured to detect obstacles such as, for example, a car, a weed, a tree, a pedestrian, a restricted zone or the like. When an obstacle is detected which prevents the vehicle 10 from advancing or reaching its destination, the vehicle 10 may re-calculate a travel path of the vehicle 10 to avoid the obstacle in its travel route.

The camera and the laser sensor are examples of an obstacle detection part detecting obstacles. When the obstacle detection part detects an obstacle Z while the vehicle 10 is driven in the direction D76 of the destination position D, the ECU 44 changes the traveling direction D10 of the vehicle 10 and drives the vehicle 10 for a predetermined time or a predetermined distance before the ECU 44 re-calculates the direction D76 of the destination position D relative to the current position of the vehicle 10.

After the direction D76 of the destination position D is re-calculated, the ECU 44 is configured to steer the vehicle 10 to align the traveling direction D10 of the vehicle 10 with the direction D76 of the destination position D re-calculated by the ECU. After the traveling direction D10 of the vehicle 10 is aligned with the direction D76 of the destination position D, the drive motors 26 drives the vehicle 10 straight in the direction D76 of the destination position D re-calculated by the ECU 44 without using the GPS receiver 54 to control the steering of the vehicle 10.

After the vehicle 10 is driven in the direction D76 of the destination position D and the magnetic sensor 36 detects the signal H from the wire (boundary wire 72, the guide wire 73, the docking wire 90, or the like), the vehicle 10 may be driven in trace mode to circuit along the wire and guided to the charging station 76 for recharging or stand-by.

In another embodiment of the disclosure, when the obstacle detection part detects an obstacle Z while the vehicle 10 is driven in the direction D76 of the destination position D, the ECU 44 changes the traveling direction D10 of the vehicle 10 and drives the vehicle 10 for a predetermined distance (or a predetermined time) in search of a wire (boundary wire 72, the guide wire 73, the docking wire 90, or the like), and when the wire is detected the vehicle 10 may be driven in trace mode to circuit along the wire and guided back to the charging station 76 for recharging or stand-by. If the wire is not detected after travelling the predetermined distance or the predetermined time, the ECU 44 re-calculates the direction D76 of the destination position D relative to the current position of the vehicle 10.

It should be understood, the GPS receiver 54 may be turned on in the cases in which the obstacle detection part detects an obstacle Z in order for the vehicle 10 to re-calculate the direction D76 of the destination position D relative to the current position of the vehicle 10.

Furthermore, after the vehicle 10 is driven straight in the direction D76 of the destination position D and the magnetic sensor 36 detects the signal H from the wire (boundary wire 72, the guide wire 73, the docking wire 90, or the like), the GPS receiver 54 may be used (or turned on) to search for a direction of the station 76 relative the vehicle 10. However, the disclosure is not limited thereto, and after detecting the wire, a direction of the station 76 relative the vehicle 10 may be obtained from the signal H from the wire.

In another embodiment of the disclosure, the vehicle 10 may store in the memory 44c or transmit to a server, a GPS location (or a plurality of GPS locations) where a wire signal was previously detected by the vehicle 10, and when the obstacle detection part detects an obstacle Z while the vehicle 10 is driven in the direction D76 of the destination position D, the vehicle 10 may be driven in the direction towards the wire closest to the current position of the vehicle 10 according to the GPS information stored in the memory 44c or transmitted to the server. After the magnetic sensor 36 detects the signal H from the wire, the vehicle 10 may be driven in trace mode to circuit along the wire and guided to the charging station 76 for recharging or stand-by.

In the above described embodiments, the vehicle 10 that is a robotic lawnmower including a blade for cutting grass was described. However, the disclosure is not limited thereto, and the vehicle 10 may be a cultivator for farming, a snow plow for plowing snow, a transport vehicle for transporting goods, or the like.

Although embodiments of a travel route control of the autonomous work vehicle using a global navigation satellite system (GNSS) of the disclosure have been described above based on some examples, the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An autonomous work vehicle, comprising:
a position information obtaining unit, comprising a global navigation satellite system receiver, acquiring a position of the autonomous work vehicle;
a driving unit, comprising a motor;
a control unit, comprising a processor;
a memory, storing a destination position, wherein the destination position is a charging station where the autonomous work vehicle docks to recharge power;
a signal detection part, comprising a sensor, detecting a signal emitted by a signal generating device;
an obstacle detection part, comprising a sensor, configured to detect obstacles;
wherein the processor is configured to calculate a direction of the destination position relative to a current position of the autonomous work vehicle, the direction is calculated using the current position of the autonomous work vehicle and the position of the predetermined destination,
wherein the signal detection part is configured to detect a magnetic field signal emitted from a wire disposed at a working area of the autonomous work vehicle,
wherein in a case when the autonomous work vehicle is not traveling along the wire and the autonomous work vehicle is located away from the destination position, the driving unit drives the autonomous work vehicle in a traveling direction toward the direction of the destination position calculated by the processor,
wherein when the obstacle detection part detects an obstacle while the autonomous work vehicle is driven in the direction of the charging station, the control unit changes the traveling direction of the autonomous work vehicle and drives the autonomous work vehicle for a predetermined time before the processor re-calculates the direction of the charging station relative to the current position of the autonomous work vehicle,
wherein the autonomous work vehicle is a robotic lawn mower comprising a blade to cut grass,
wherein the position information obtaining unit acquires a position of the autonomous work vehicle while the autonomous work vehicle is docked at the station, and the destination position is set using the position, wherein the destination position is set by averaging a plurality of positions wherein, after the autonomous work vehicle is driven in the direction of the destination position and the signal detection part detects the signal generated by the signal generating device, the control unit controls the autonomous work vehicle based on the detected signal, wherein the signal detection part detects a guidance signal for guiding the autonomous work vehicle to the station, wherein the control unit controls the autonomous work vehicle to travel along the wire while keeping a predetermined variable distance between the autonomous work vehicle and the wire by steering the autonomous work vehicle to keep the detected magnetic field signal within a predetermined range, wherein the control unit is configured to steer the autonomous work vehicle to align the traveling direction of the autonomous work vehicle with the direction of the destination position calculated by the processor, and after the traveling direction of the autonomous work vehicle is aligned with the direction of the destination position, the driving unit drives the autonomous work vehicle straight in the direction of the destination position calculated by the processor without using the global navigation satellite system receiver, wherein the global navigation satellite system receiver is turned off while the driving unit drives the autonomous work vehicle straight in the direction of the destination position, wherein the blade of the robotic lawn mower is turned off so as to not cut grass when the robotic lawn mower is driven in the direction of the charging station.

2. The autonomous work vehicle according to claim 1, wherein the predetermined variable distance is between 1 meter to 1.10 meters.

3. The autonomous work vehicle according to claim 1, wherein after the autonomous work vehicle is driven straight in the direction of the destination position without using the global navigation satellite system receiver, and the signal detection part detects the signal from the wire, the control unit uses data obtained from the global navigation satellite system receiver to calculate the direction of the destination position relative to the current position of the autonomous work vehicle.

4. The autonomous work vehicle according to claim 1, further comprising:

a first magnetic sensor and a second magnetic sensor sensing a magnetic field signal.

5. An autonomous work vehicle, comprising:

a position information obtaining unit, comprising a global navigation satellite system receiver, acquiring a position of the autonomous work vehicle;

a driving unit, comprising a motor;

a control unit, comprising a processor;

a memory, storing a destination position, wherein the destination position is a charging station where the autonomous work vehicle docks to recharge power;

a signal detection part, comprising a sensor, detecting a signal emitted by a signal generating device;

an obstacle detection part, comprising a sensor, detecting obstacles, wherein the processor is configured to calculate a direction of the destination position relative to a current position of the autonomous work vehicle, the direction is calculated using the current position of the autonomous work vehicle and the position of the predetermined destination, wherein the signal detection part is configured to detect a magnetic field signal emitted from a wire disposed at a working area of the autonomous work vehicle, wherein in a case when the autonomous work vehicle is not traveling along the wire and the autonomous work vehicle is located away from the destination position, the driving unit drives the autonomous work vehicle in a traveling direction toward the direction of the destination position calculated by the processor, wherein when the obstacle detection part detects an obstacle while the autonomous work vehicle is driven in the direction of the charging station, the control unit changes the traveling direction of the autonomous work vehicle and drives the autonomous work vehicle for a predetermined distance before the processor re-calculates the direction of the charging station relative to the current position of the autonomous work vehicle, wherein the autonomous work vehicle is a robotic lawn mower comprising a blade to cut grass, wherein the position information obtaining unit acquires a position of the autonomous work vehicle while the autonomous work vehicle is docked at the station, and the destination position is set using the position, wherein the destination position is set by averaging a plurality of positions wherein, after the autonomous work vehicle is driven in the direction of the destination position and the signal detection part detects the signal generated by the signal generating device, the control unit controls the autonomous work vehicle based on the detected signal, wherein the signal detection part detects a guidance signal for guiding the autonomous work vehicle to the station, wherein the control unit controls the autonomous work vehicle to travel along the wire while keeping a predetermined variable distance between the autonomous work vehicle and the wire by steering the autonomous work vehicle to keep the detected magnetic field signal within a predetermined range, wherein the control unit is configured to steer the autonomous work vehicle to align the traveling direction of the autonomous work vehicle with the direction of the destination position calculated by the processor, and after the traveling direction of the autonomous work vehicle is aligned with the direction of the destination position, the driving unit drives the autonomous work vehicle straight in the direction of the destination position calculated by the processor without using the global navigation satellite system receiver, wherein the global navigation satellite system receiver is turned off while the driving unit drives the autonomous work vehicle straight in the direction of the destination position, wherein the blade of the robotic lawn mower is turned off so as to not cut grass when the robotic lawn mower is driven in the direction of the charging station.

6. The autonomous work vehicle according to claim 5, further comprising:

a first magnetic sensor and a second magnetic sensor sensing a magnetic field signal.

\* \* \* \* \*